United States Patent [19]

Pocock et al.

[11] Patent Number: 5,014,125
[45] Date of Patent: May 7, 1991

[54] TELEVISION SYSTEM FOR THE INTERACTIVE DISTRIBUTION OF SELECTABLE VIDEO PRESENTATIONS

[75] Inventors: Terrence H. Pocock, Delaware; Rick McNorgan, London; Peter Coumons, London; Allan Lodberg, London, all of Canada

[73] Assignee: Cableshare, Inc., London, Canada

[21] Appl. No.: 347,732

[22] Filed: May 5, 1989

[51] Int. Cl.⁵ .............................................. H04N 7/10
[52] U.S. Cl. ..................................... 358/86; 358/143; 379/105; 455/4
[58] Field of Search ................. 358/86, 142, 143, 146; 379/96, 101, 102, 104, 105; 455/3-6

[56] References Cited

U.S. PATENT DOCUMENTS

| | | | |
|---|---|---|---|
| 4,295,154 | 10/1981 | Hata et al. | 358/86 X |
| 4,450,477 | 5/1984 | Lovett | 358/86 |
| 4,450,481 | 5/1984 | Dickinson | 358/86 X |
| 4,484,218 | 11/1984 | Boland et al. | 358/86 |
| 4,558,464 | 12/1985 | O'Brien, Jr. | 455/4 |
| 4,734,764 | 3/1988 | Pocock et al. | 358/86 |
| 4,792,849 | 12/1988 | McCalley et al. | 358/86 |
| 4,816,905 | 3/1989 | Tweedy et al. | 358/86 |
| 4,829,372 | 5/1989 | McCalley et al. | 358/86 |

Primary Examiner—Jin F. Ng
Assistant Examiner—Wing F. Chan
Attorney, Agent, or Firm—Burns, Doane, Swecker & Mathis

[57] ABSTRACT

An interactive television system employs a telephone connection in a two-way manner to send command signals from a viewer to a central controller to select various presentations and to send the audio portion of such presentations from a central location to individual viewers. When a connection is first established over the telephone lines between a viewer and the central controller, a transmission path identification is sent from the viewer's terminal to the central controller which indicates the particular video transmission path, e.g. trunk line and/or television channel, connecting the viewer to the central location. This path is then used to control the transmission of uniquely addressed video presentations from the central location to the viewer's terminal, where they are stored and retransmitted to the viewer's receiver.

56 Claims, 6 Drawing Sheets

TELEVISION SYSTEM FOR THE INTERACTIVE DISTRIBUTION OF SELECTABLE VIDEO PRESENTATIONS

BACKGROUND OF THE INVENTION

The present invention is generally directed to systems for selectively distributing video presentations to viewers and more particularly concerned with systems for enabling viewers to interactively select still frame video images and accompanying audio to be distributed to them over a television system such as a cable network.

A still frame television distribution system of the type to which the present invention applies is disclosed, for example, in U.S. Pat. No. 4,734,764. Such a system is particularly suited for interactive video services such as home shopping, financial transactions, education and the like. Generally speaking, in this type of system a viewer sends an indication to a central location describing a video presentation which he desires to receive, e.g. houses being offered for sale by a real estate service. Video frames which show the available houses are individually retrieved from a suitable video storage medium, and each frame is encoded with an address. Other viewers can simultaneously request other presentations available on the system. All of the addressed frames selected by the various viewers are multiplexed onto a transmission medium, such as the trunk cable of a cable television system, and transmitted at the standard television frame rate, e.g. 30 frames per second under the NTSC standard, over a channel associated with the video presentation service. Frame stores are positioned at various locations along the length of the transmission medium, and each is provided with a unique address. The transmission path along which the video signals travel from the central location to the frame stores is referred to as a primary transmission path. When a video frame is encoded with the address of a particular frame store, that frame store retrieves the frame from the primary path, stores it in a memory, and then continually retransmits the stored frame at the standard television frame rate along a secondary path located between the frame store and the viewer's television receiver. In the embodiment disclosed in the '764 patent, this secondary path can comprise a distribution cable which branches from the trunk cable, and/or a drop cable which branches from the distribution cable to an individual viewer's home. The transmission of the frame along the secondary path can be on the same channel as the primary path, or a different channel. The continually transmitted frame appears as a still frame on the viewer's receiver. When the viewer desires to see the next frame in the presentation, a signal is sent to the central location over the telephone line, and this frame is retrieved, encoded with the address of the viewer's frame store, and transmitted over the primary path to be displayed in the same manner.

The system disclosed in the '764 patent provides a practical approach which enables the selective distribution of video presentations to be implemented in a conventional television system having a finite number of available channels. Unlike other distribution systems which rely upon dedicated transmission paths or transmission channels for individual subscribers, a system as disclosed in the '764 patent requires as little as one channel on the television system to provide selective distribution to all viewers. If the television system has sufficient capacity, it is possible to employ a first channel or limited number of channels for transmission over the primary path, and a different channel common to all viewers for transmission over the secondary paths.

It is desirable to build upon the fundamental principles disclosed in the '764 patent in a manner which increases the functionality, and hence the effectiveness, of such a system. For example, it is desirable to increase the capacity of the system in a manner which increases the efficiency with which transmission network resources are utilized. It is also desirable to reduce the likelihood that viewer contention problems could arise as the number of viewers having access to the system increases.

Accordingly, it is a general objective of the present invention to provide a novel distribution system which utilizes the capacity of a television system, particularly a cable system, in an economic fashion, and thereby minimizes contention problems as the number of viewers in the system increases. Along these lines, it is a more specific objective of the present invention to provide a distribution system which allows the expansion of services in an economic fashion and provides the viewer with greater and easier access to the available video presentations, while at the same time ensuring the privacy of presentations selected by the viewer. To this end, it is an objective of the invention to provide a novel distribution system in which various types of presentations can be specifically directed to certain viewers. It is a further objective to provide a distribution system that is easy to install at the viewer location.

BRIEF STATEMENT OF THE INVENTION

In one aspect of the invention, these objectives are attained by using the telephone network to establish a two-way communication path between the viewer's location and the central location. Information pertaining to the viewer, as well as commands related to the viewer's selections for presentations and other data, are transmitted to the central location from a terminal at the viewer's site by means of a telephone connection. This same telephone connection is used to transmit audio information from the central location to the viewer's terminal, where it is combined with video information transmitted over another medium to form a presentation that is reproduced for the viewer.

In another aspect of the invention, commands and data are transmitted from the central location to the viewers' terminals through the video transmission medium. These commands and data increase the functionality of the terminal and increase the services that can be provided through the interactive system.

Other more specific features of the present invention which enable it to accomplish the foregoing objectives are explained in greater detail with reference to a specific embodiment of an interactive television system illustrated in the accompanying drawings.

DESCRIPTION OF THE ILLUSTRATED EMBODIMENTS

In the following discussion of the illustrated embodiment, reference is made to the implementation of the interactive system in a cable television network, to facilitate an understanding of the principles of the invention and its manner of operation. It will be appreciated, however, that the system can be implemented in television networks which use other forms of transmission media, and is not limited to cable networks alone.

The structural arrangement of the disclosed interactive television system will first be described with reference to the general mode of operation of the system. Specific features of the system will then be described by means of a more detailed discussion of the operation of the system.

STRUCTURAL ARRANGEMENT

Figure 1:
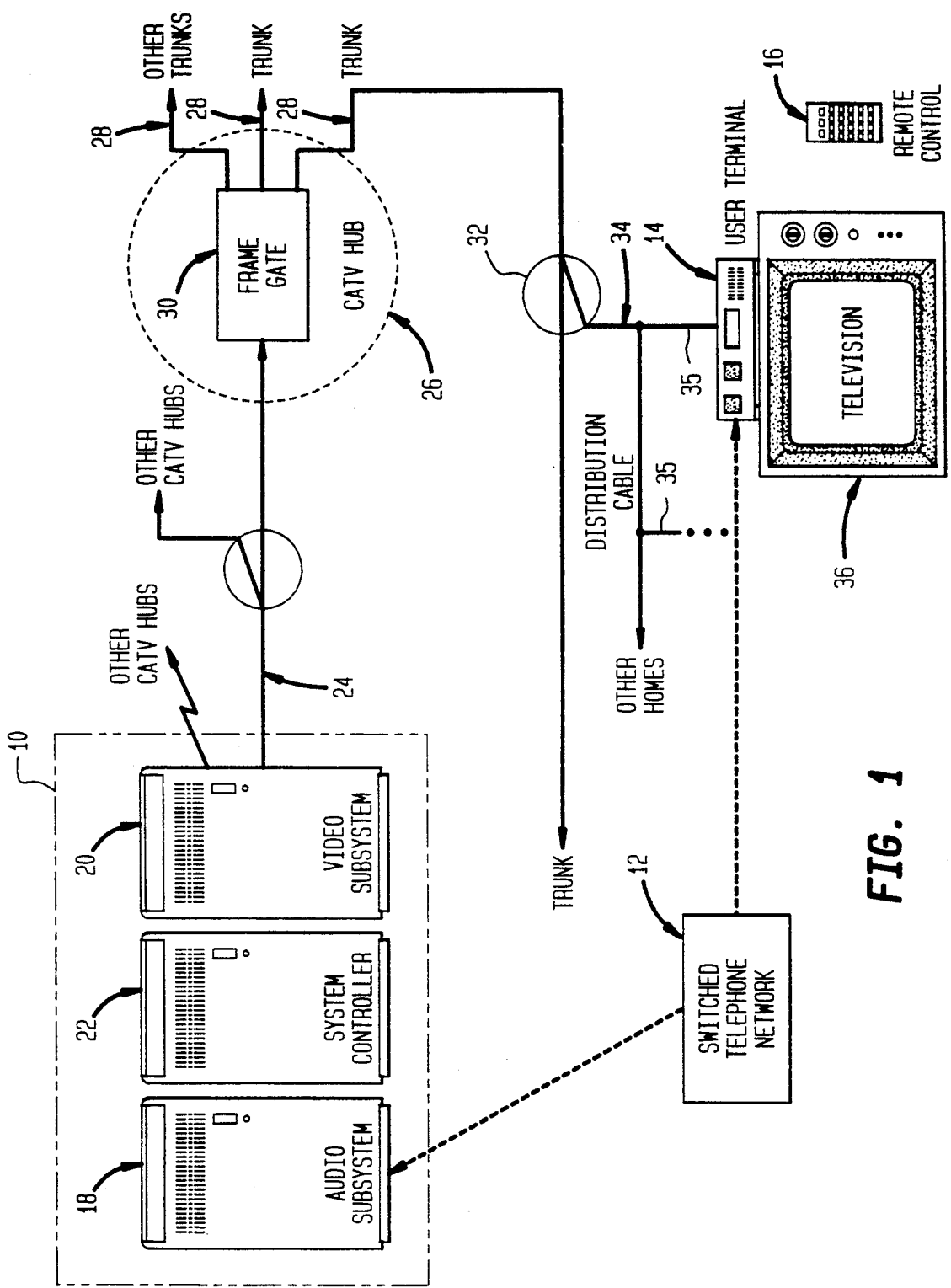
FIG. 1 is a schematic representation of an interactive television system implemented in accordance with the present invention.

A general overview of an interactive television system incorporating the principles of the present invention is illustrated in FIG. 1. In operation, a viewer sends instructions to a presentation system 10 at a central location to identify one or more presentations that are desired to be viewed. These instructions are transmitted from the viewer's remote location to the central location by means of an existing wire or fiber optic telephone network 12. For example, the instructions might be transmitted as dual tone multifrequency (DTMF) signals which the user generates by depressing buttons of the keypad on his telephone set. More preferably, however, the instructions are generated within a user terminal 14 located at the viewer's home, and transmitted over the telephone network as DTMF tones. For ease of use, the terminal 14 is preferably controlled by means of a remote control unit 16 which transmits instructions to the terminal 14 via infrared signals.

The presentation system 10 processes the incoming requests from the viewers and retrieves video frames and accompanying audio associated with the presentations desired by the various viewers. Each frame is encoded with an address identifying the viewer for whom it is intended, and all of the selected video frames are assembled into a video signal that is transmitted to the viewers. The presentation system 10 basically comprises two main subsystems, an audio subsystem 18 and a video subsystem 20. The servicing of the incoming requests and assembly of requested frames into a video signal by these two subsystems is carried out under the management of a system controller 22.

Once the various requested frames have been assembled into a video signal, this signal is transmitted over a trunk line 24 or via microwave signals to one or more CATV hubs 26. These transmissions can take place on one channel or over multiple channels. At the CATV hub, the video signal is retransmitted on a trunk cable 28 over a television channel associated with the interactive service. If the channel used to transmit the video presentations to the hub 26 is different from that used to distribute the presentations to the viewers, the CATV hub 26 can include a frame gate 30 which switches the frames onto appropriate respective paths and channels in accordance with the locations of the viewers who have requested them. For example the frame gate could switch the incoming signals among multiple primary paths which could comprise separate trunk lines 28 as shown in FIG. 1. Alternatively, or in addition, the frame gate 30 could distribute the incoming signals among multiple channels on the same trunk.

Nodes 32 are located along each of the trunk cables 28. At each node a distribution cable 34 is connected to the trunk cable. The distribution cable carries the video signals on all channels within the cable television network from the trunk cable to drop lines 35 which feed into individual viewers' homes. The drop lines 35 are connected to the user terminals 14 within the respective homes.

When a viewer activates the terminal 14 to view a video presentation, the user terminal 14 is tuned to a channel associated with the interactive television network, e.g. channel 33. The user terminal searches the frames transmitted over that channel for those which are encoded with its particular address, and stores each such frame, one at a time, in a frame store. The stored frame is continually retransmitted from the terminal 14 to the viewer's television receiver 36 for display as a still frame. When the next frame in a desired presentation reaches the user terminal, it replaces the preceding frame in the frame store and is then displayed.

Figure 2:
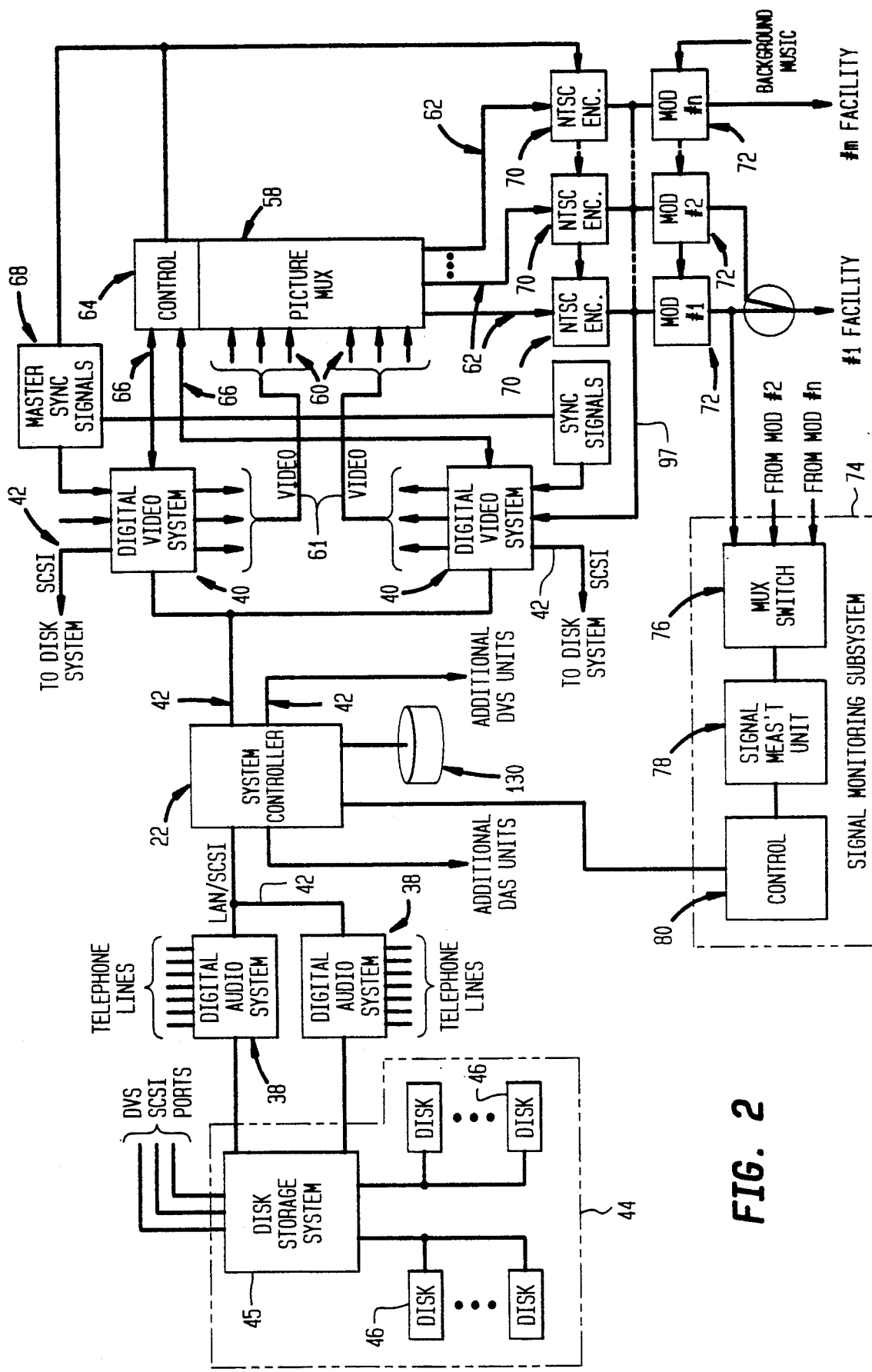
FIG. 2 is a block diagram illustrating the presentation system in the interactive television network.

A more detailed block diagram of the presentation system 10 is illustrated in FIG. 2. The audio subsystem comprises a number of DAS (Digital Audio System) control units 38, and the video subsystem includes a number of DVS (Digital Video System) control units 40. Each of the control units 38 and 40 communicates with the system controller 22 by means of a local area network (LAN), for example a SCSI bus 42. All of the control units also communicate with a disk storage system 44 by means of the LAN. The disk storage system 44 stores digitized information for the various video presentations, that are available by means of the interactive network, including the audio that accompanies each presentation. Preferably, the digitized video information is stored in a compressed form. As illustrated in FIG. 2, a single disk storage system 44 is shared by all of the DAS control units 38 and the DVS control units 40. If desired, however, separate disk storage systems could be respectively associated with the audio subsystem and the video subsystem.

The disk storage system 44 includes a multiported controller 45 having a number of ports respectively connected to the DAS and DVS control units. The controller 45 also has a number of ports respectively connected to a plurality of disk drives 46. The controller receives disk control commands, such as read and write data for example, from the DAS and DVS control units via the LAN, and sends stored data from the disks to the control units.

Figure 3:
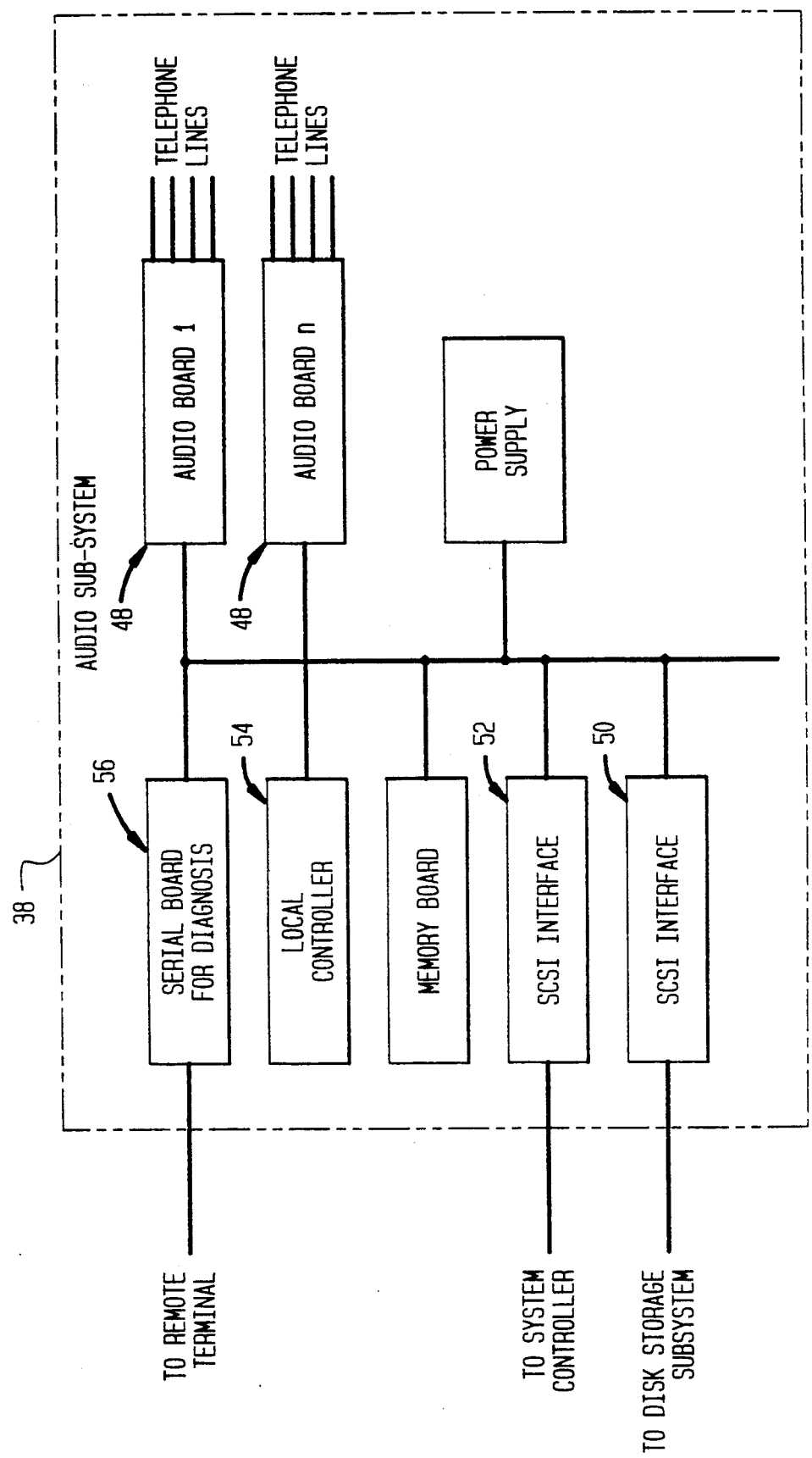
FIG. 3 is a more detailed block diagram of the audio subsystem.

A DAS control unit is illustrated in block diagram form in FIG. 3. Referring thereto, each control unit includes a plurality of audio boards 48 having a number of telephone line interfaces. In the illustrated example, each audio board is connected to four telephone lines. The audio boards are capable of detecting incoming calls and DTMF tones transmitted over the telephone lines. The boards are provided with D/A converters, to enable digitized audio messages retrieved from the system 44 to be replayed as analog audio to a user via the telephone lines. In addition, each audio board can include an A/D converter per line interface, to digitize voice messages received on the telephone lines for storage in the disk storage system.

The DAS control unit 38 includes an interface 50 for the disk storage system. This interface enables the digitized audio messages to be stored in the storage system and retrieved therefrom. The DAS control unit also includes an interface 52 for communicating with the system controller 22 over the LAN. This interface enables control messages to be transmitted between the system controller 22 and the DAS control unit 38.

A local controller, e.g. a microprocessor, in the DAS control unit 38 scans the telephone line circuits and reports line events, such as line ringing and the receipt of DTMF tones, to the system controller 22. In operation, the local controller 54 scans each idle line interface circuit and detects incoming calls. When an incoming call is detected, a message is sent to the system controller 22 via the interface 52. The controller 54 also scans each active line to detect the presence of DTMF tones, and sends messages to the system controller 22 when predetermined tones are received. In response to commands from the system controller 22, the local controller 54 controls each of the interface circuits within the audio boards 48 to answer calls, retrieve audio messages from the disk subsystem and play them on designated lines, select idle lines and dial specified telephone numbers, transmit tones on the lines and disconnect a line when a viewing session has been concluded.

If desired, the DAS control unit can be provided with a serial communications port 56 to enable communications to be carried out with a remote terminal for diagnostic and testing purposes. For example, the remote terminal might instruct one of the audio boards 48 to dial out on a number that causes a connection to be made to another one of the boards. Test signals can then be transmitted between the two boards to test the operating quality of the telephone portion of the system.

Referring again to FIG. 2, each of the DVS control units 40 receives compressed, digitized video information stored in the disk storage system 44, expands it and converts it into a video signal. In addition, the DVS control units insert appropriate address and control information into the vertical blanking interval of each frame to be transmitted. The DVS control unit can also insert text which is to be overlaid upon a selected image. Once the video frame has been composed within the DVS control unit, it is supplied to a picture multiplexer 58.

The picture multiplexer 58 has video input ports 60 which receive the video signals from the DVS control units 40 over video lines 61. The multiplexer has multiple output ports 62 corresponding to the number of transmission paths. Preferably, each of the input and output ports comprises an RGB video port.

Associated with the picture multiplexer 58 is a controller 64 containing a command/status register for each DVS control unit 40. The DVS control units communicate with the controller 64 over control lines 66 to provide information which identifies the transmission path for the video frame from that control unit, an indication of whether the frame is to be transmitted in a field or frame mode, and the input port number where the frame appears. This information is written into the command/status register associated with the DVS control unit.

The controller 64 arbitrates among all of the input ports at which a video signal has been presented for transmission. Each such input port is serviced in turn, by selecting an output port based upon the identification of the transmission path in the command register, and activating an electronic switch within the multiplexer 58 to gate the input port to the selected output port at the start of the vertical interval of the next field. In this regard, master timing information for synchronizing the transmission of all of the video frames at the respective input ports is provided by a master sync signal generator 68. This generator produces horizontal and vertical interval pulse signals which are supplied to the controller 64 for the picture multiplexer and to each of the DVS control units 40. These pulses are used to control the timing with which video frames are presented to the input ports of the picture multiplexer and switched to its output ports to thereby ensure that a continuous, synchronized video signal appears at each output port at a standard television frame rate, e.g. 30 frames per second in the NTSC format.

Once the transmission of a video frame has been completed, the controller places an appropriate status bit in the command/status register for the DVS control unit from which the frame originated, to thereby provide an indication that the multiplexer is ready to receive the next frame from the control unit.

The video signals present at the output ports of the picture multiplexer 58, which are in RGB format, are applied to respective NTSC composite video encoders 70. Each of these encoders receives synchronizing signals from the master signal generator 68, including a reference color subcarrier, as well as horizontal and video synchronizing signals. The RGB video signals are converted to NTSC composite video signals, and applied to respective TV channel modulators 72. The modulators have audio input ports which receive background music that is to accompany the video presentations. The modulated output signals from the modulators are coupled to a suitable transmission facility for dissemination to the viewers. This facility can be a coaxial or fiber optic cable, a broadcast transmitter, or a microwave channel for distribution to individual receivers, a CATV hub or a satellite for DBS broadcasts.

If desired, the presentation system can be provided with a signal monitoring subsystem 74 to detect faults within the video processor and the picture multiplexer. The signal monitoring subsystem includes a multiplexing switch 76 having plural inputs respectively connected to the output ports of the modulators 72. A video signal measuring unit 78 receives the multiplexed signal from the switch 76. This unit measures various video signal parameters, such as signal level, synchronization timing, and the like. In addition, it can be provided with a suitable means to detect and decode the addresses inserted in the vertical blanking intervals of the frames, as well as any control and information data which has been inserted into any scan line of a field or a frame.

The results measured by the signal measurement unit 78 are supplied to a control unit 80 which monitors the results and sends an alarm message to the system controller 22 whenever a measurement is not within nominal operating limits. The control unit 80, in response to commands from the system controller 22, also activates the multiplexing switch 76 to capture video signals destined for specific addresses.

Figure 4:
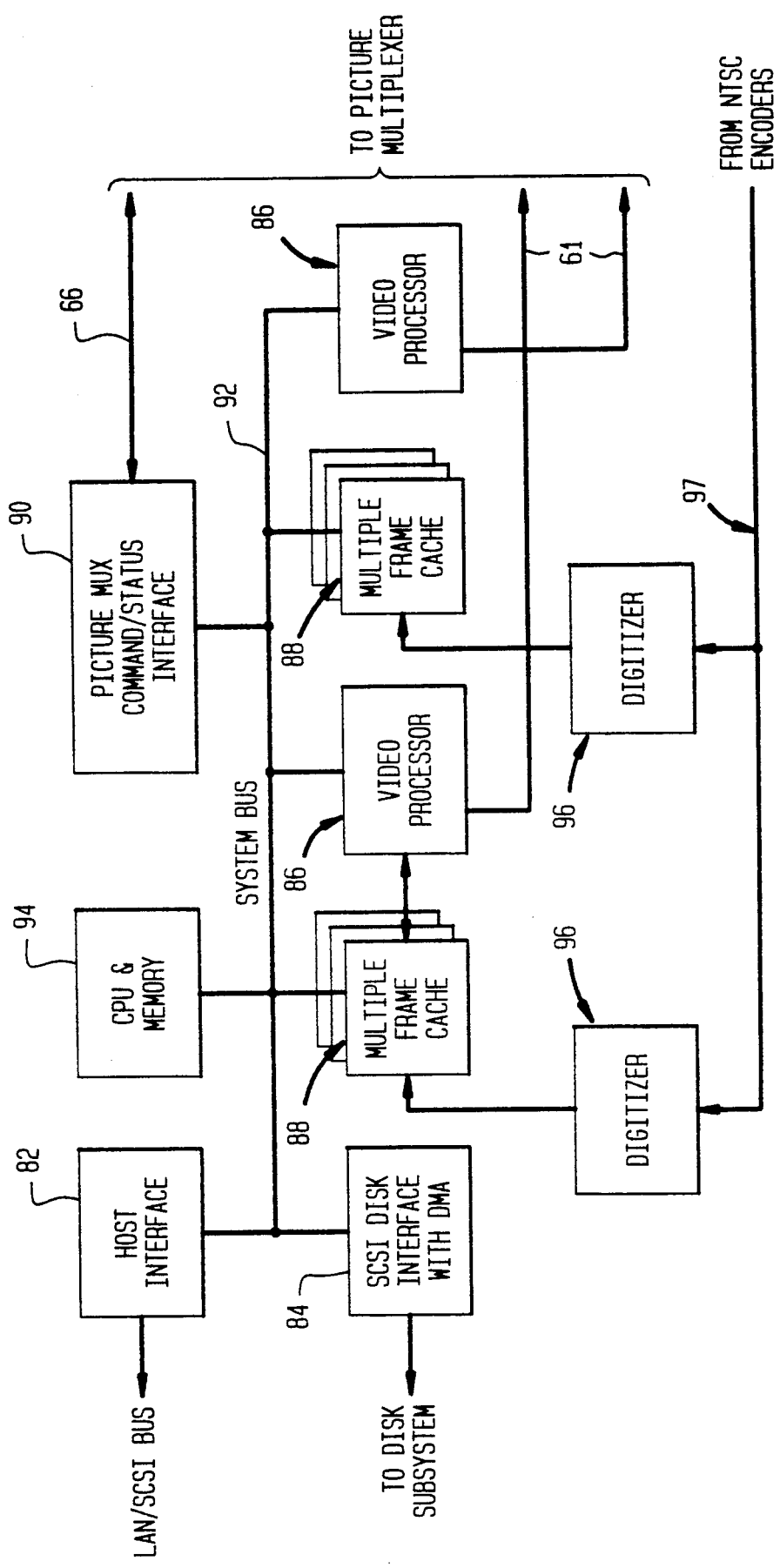
FIG. 4 is a more detailed block diagram of the video subsystem.

The structure of the DVS control units 40 is illustrated in greater detail in the block diagram of FIG. 4. Referring thereto, the control unit includes a pair of interfaces 82 and 84 for respectively communicating with the system controller 22 and the disk storage system 44 over the local area network. The control unit also includes multiple video processors 86, two of which are shown in the implementation of FIG. 4. The basic functions of the video processor are to decompress a compressed image file that is received from the disk storage system, and to convert the decompressed image into an analog video signal by means of an internal D/A converter. In addition, the video processor 86 superimposes on the video image text information as supplied from the system controller 22, the retrieved image file, or both. The converted and decompressed video signal from the video processor is supplied to the picture multiplexer 58 over a video line 61.

Associated with each video processor 86 is an image cache 88 for storing the video images prior to and/or during processing. For example, a compressed image file received from the disk storage system 44 through the interface 84 can be loaded into the image cache 88 associated with a particular video processor 86. When the processor is ready to process the loaded image it can retrieve it from the cache, decompress it and add any text strings that are appropriate. In addition, the address for the video frame is inserted in the frame's vertical blanking interval. These activities are carried out under the direction of a local controller 94 which communicates with the other components of the DVS control unit by means of a local bus 92. After the video processor has completed these tasks, it can store the processed frame in the cache 88 and send a signal to the multiplexer controller 64 through an interface 90 to indicate that it has a video frame ready to be transmitted. Subsequently, when the controller returns a command over the control line 66 that it is ready to receive the frame, the video processor retrieves the frame from the cache, converts it from a digital to an analog signal, and supplies it to the multiplexer over its video line 61. The timing of these operations is controlled by the synchronizing pulses from the master sync signal generator 68. With this arrangement of caches for each video processor, subsequent images can be retrieved and decompressed in the video processor boards while previously processed images are queued for a time slot in the output transmission medium.

To enable the video subsystem to be tested, a digitizer 96 can be associated with each video processor and its image caches. Each digitizer receives an analog video frame from one of the NTSC encoders 70 and converts it into a digital video frame. This frame is stored in a portion of the image cache 88. The local controller 94 can perform a bit-by-bit comparison of the frame from the digitizer 96 with the processed frame previously stored in another area of the cache by the video processor 86. The results of this comparison provide an indication of the quality of operation of the D/A portion of the video processor, the multiplexer 58 and the NTSC encoder 70.

Figure 5:
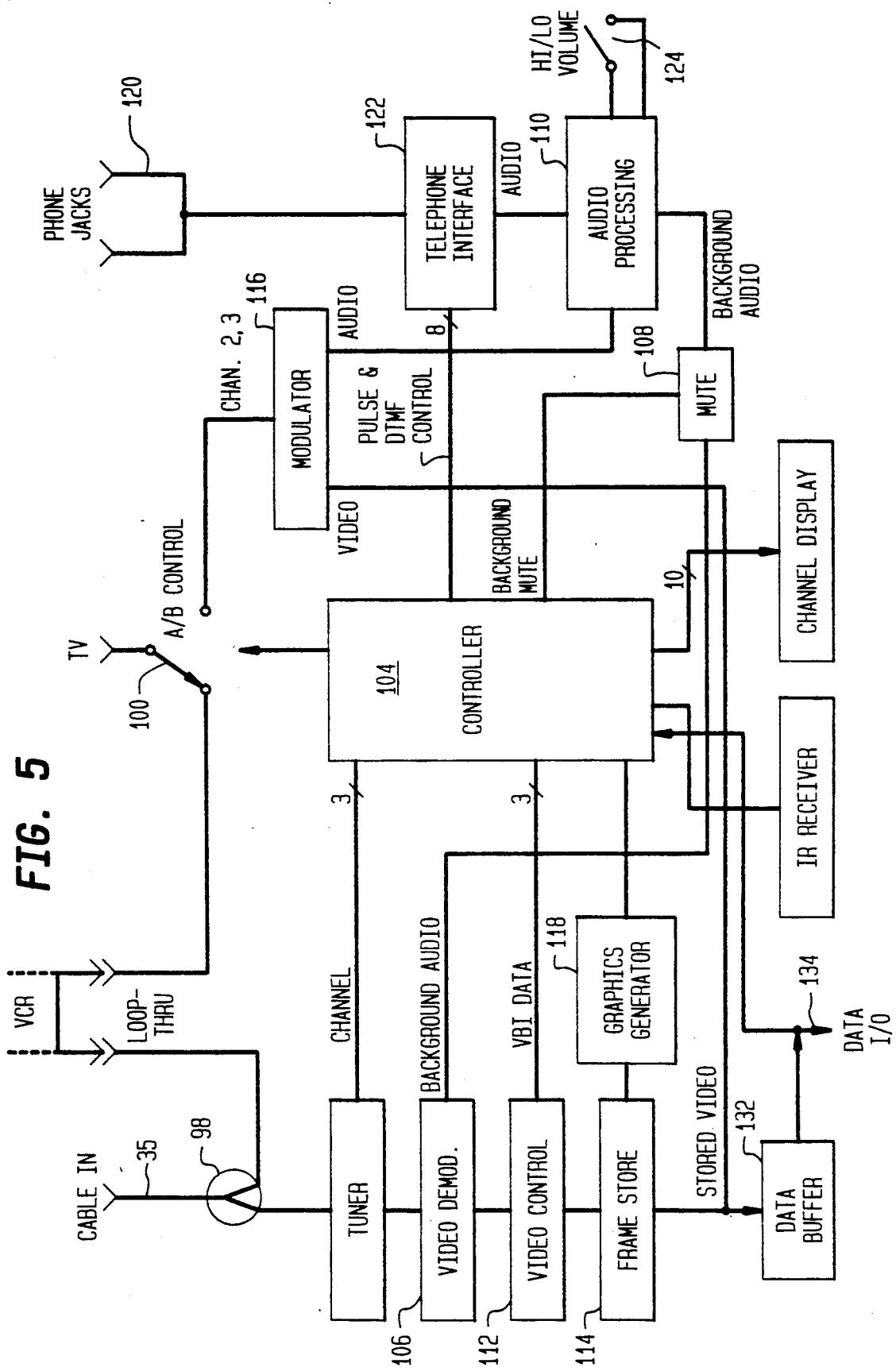
FIG. 5 is a detailed block diagram of a user terminal.

After the DVS control unit has supplied the analog video signal to the picture multiplexer 58, the signal is converted into an NTSC format signal in one of the encoders 70, modulated onto an appropriate channel frequency and transmitted to the user terminals 14 by means of an appropriate transmission facility, such as a trunk cable. The structure of the user terminal is illustrated in FIG. 5. Referring thereto, the input line to the viewer's home, such as a drop cable 35, is connected to a signal splitter 98. One output terminal of the splitter is connected to any user accessories, such as a video cassette recorder, and thence to the viewer's TV receiver by means of a control switch 100. During normal viewing, the control switch 100 is in the position shown in FIG. 5, where the TV is directly connected to the input cable.

The other output terminal of the splitter 98 is connected to a channel tuner 102. This tuner is adjusted to a particular television channel associated with the interactive service, e.g. channel 33. The adjustment of the tuner to this channel is carried out by means of a control signal from a controller 104.

The tuner passes only the signal at the designated channel for the service to which it is currently tuned. This signal comprises the sequence of decompressed and addressed video frames assembled in the picture multiplexer 58, as well as the background audio signal that has been combined with the video signal. The signal carried on the designated channel is applied to a video demodulator 106, which separates the background audio signal from the video information. The background audio signal is applied to a muting circuit 108. Under control of the controller 104, the muting circuit 108 selectively blocks the background audio signal or passes it along to an audio processing circuit 110.

The video information from the video demodulator 106 is presented to a video control circuit 112. This control circuit is supplied with data from the controller 104. In part, this data contains the address of the viewer. In response to this information, the video control circuit detects data which is encoded in the vertical blanking interval of each frame and determines whether any frame carries the specific address supplied by the controller 104. If that address is detected in the vertical blanking interval of a frame, the frame is gated to a frame store 114. The video frame stored within the frame store 114 is continually read out of the frame store and applied to a modulator 116 at the standard television frame rate. If locally generated graphics are to be displayed with the frame, they are generated in a graphics generator 118 under instructions from the controller 104, and included with the information stored in the frame store 114.

The user terminal includes telephone jacks 120 for the receipt of additional information transmitted over the telephone lines. Included with this additional information can be audio signals that are specific to the frame to be displayed, such as a description of a house being shown on the TV screen. The audio information is retrieved from the incoming signal in a telephone interface circuit 122, and supplied to the audio processing circuit 110. The audio processing circuit 110 combines the audio signal from the telephone lines with the background signal, and presents the combined signal to the modulator 116. The audio processing circuit can be provided with a volume control switch 124 to enable the viewer to control the level of the background audio relative to the specific audio signal.

If the user terminal is to be located at a place where it is not convenient to connect it to a telephone line, the telephone jacks 120 can be replaced with a wireless transmission system similar to that employed in cordless telephones.

When the user desires to view a selected presentation, he enters appropriate commands into the controller 104. Those commands can be entered by depressing appropriate alpha-numeric keys on the remote control unit 16, which sends corresponding infrared signals to the user terminal. These signals are received in an infrared receiver 126 and forwarded to the controller. When the user has indicated a desire to view a presentation, the controller actuates the control switch 100 to connect the TV receiver to the modulator 116. In this condition, the receiver reproduces the frame which has been stored in the frame store 114, along with the audio signal supplied from the audio processing circuit 110. More specifically, the stored frame is repetitively read out of the frame store 114 at the standard television rate, e.g. 30 frames per second, and applied to the TV receiver to be displayed as a still frame. That still frame is continuously displayed until a new frame containing the viewer's address is received over the cable. When this occurs, the new frame replaces the previously displayed frame in the frame store 114, and is continuously displayed as a new still frame.

Operation

Further specific features of the present invention will now be described with reference to the operation of the system illustrated in FIGS. 1-5. The functions which take place within the system controller during the operation of the system are further illustrated in the task chart of FIG. 6.

To initiate a viewing session, the viewer activates the user terminal 14 by depressing appropriate keys on the remote terminal 16. Such a result may be accomplished, for example, by depressing an on/off switch on the remote control. In addition, or more preferably in lieu of depressing the on/off switch, the viewer depresses keys which identify the particular type of presentation that is desired to be initially viewed. For example, if the interactive television system provides a "Yellow Pages" type of directory service, the viewer might activate his user terminal by pressing the "Y" key on the remote control unit. In response to this key activation, the controller 104 within the user terminal actuates the switch 100 to connect the receiver to the terminal. This action causes a generic welcome screen, which is addressed to all terminals in an idle mode, to be displayed on the viewer's receiver. At this time, the terminal also sends pulse or DTMF control signals, depending upon the type of telephone service available, to the telephone interface unit 122. These control signals identify the telephone number of the presentation system 10 associated with the interactive television network. The telephone interface 122 causes the telephone number of the presentation system to be dialed.

Figure 6:
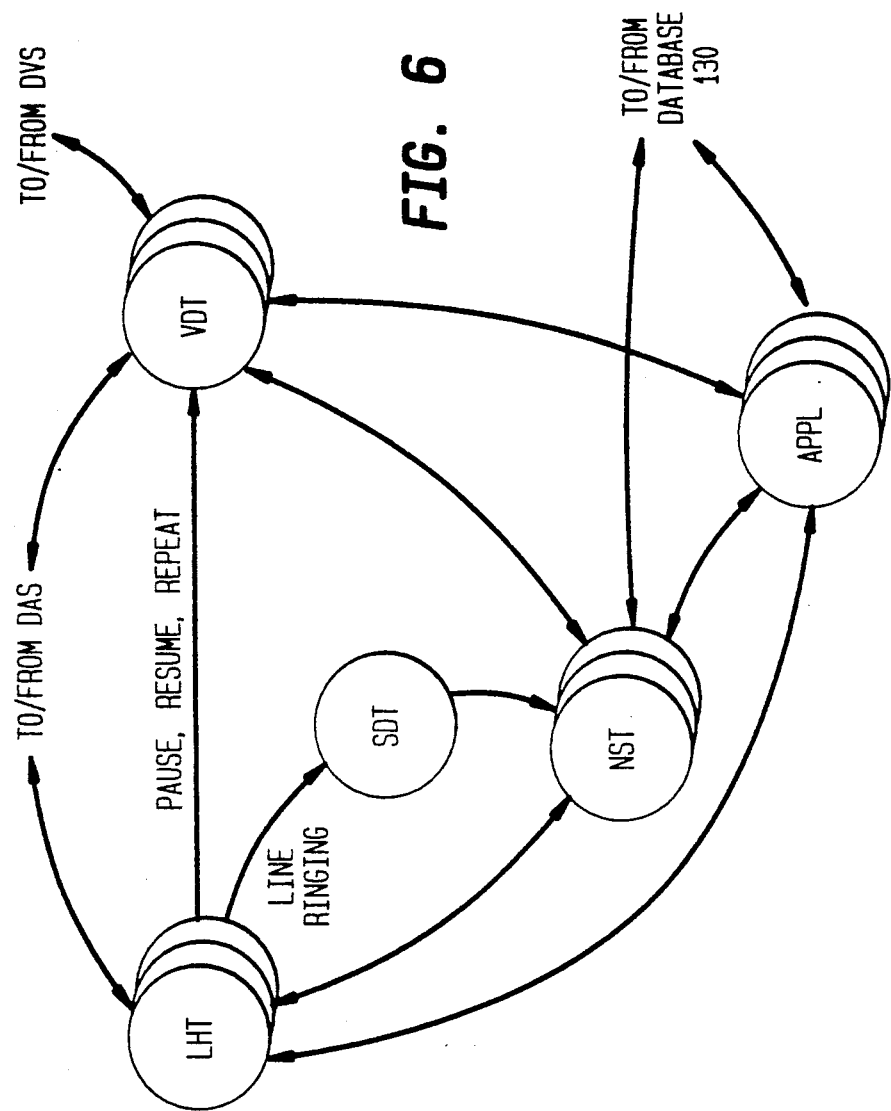
FIG. 6 is a chart illustrating the relationship of the tasks which are handled within the system controller.

Upon receipt of a ringing signal at one of the audio boards 48 within the audio subsystem of the presentation system, a signal is provided to the local controller 54 within the subsystem to indicate that the system is being called. The local controller 54 in turn sends a signal to the system controller 22 via the interface 52. This signal is detected by means of a line handler task LHT within the system controller and forwarded to a session distributer task SDT (FIG. 6). Preferably, each DAS control unit 38 has a line handler task associated with it. In response to the detection of the ringing signal, the session distributer task initiates a navigation session task NST. Such a navigation session task is opened for each active viewing session that is being carried on within the presentation system.

Upon being opened, the navigation session task sends a command to the line handler task to instruct the associated DAS control unit 38 to answer the incoming call and respond with an appropriate phrase which indicates to the viewer that he has accessed the interactive system. The navigation session task can then wait for the viewer to send identifying information through appropriate actuation of the keys on his remote control unit, which are transmitted to the presentation system as DTMF tones. More preferably, however, the identifying information is previously stored within the controller 104 of the user terminal. In this situation, the navigation session task instructs the DAS control unit to answer the call and to transmit a tone to the user terminal which signals that the presentation system has answered the call. In response to the receipt of this tone, the user terminal sends a sequence of tones to the presentation system which identify its address, the key presses which the viewer used to activate the system, for example "Y", and a transmission path identification.

The transmission path identification is encoded in the vertical blanking interval of the welcome screen that is transmitted to all terminals in the idle mode and displayed when the viewer first accesses the system. It uniquely identifies the particular cable trunk 28 to which the user terminal is connected and, in a multichannel service, the television channel to which the terminal is tuned at the time that access is made and the welcome screen is captured. This information is retrieved from the captured frame and sent back to the presentation system 10 by means of the telephone connection. Upon receipt of this information, the presentation system can transmit an audio message to the viewer to prompt him to enter a personal ID or a password. Once the viewer enters this information through his remote control unit, he is logged onto the system.

As an alternative to sending a tone from the presentation system 10 to the user terminal 14 upon receipt of a ringing signal, the user terminal can wait a predetermined period of time after dialing the system and then automatically transmit the address, key presses and transmission path ID.

To facilitate the use of the telephone lines for the transmission of the audio portions of presentations, audio processing can be carried out within the user terminal. To this end, when the initial handshaking routines are being carried out between the terminal and the presentation system during the log-on process, the presentation system can send a predetermined sequence of tones through the telephone lines which are received at the user terminal. The telephone interface circuit 122 of the user terminal can detect the level and frequency response of its particular connection, and use the detected results to adjust the gain of the audio receiving circuits accordingly. For example, in a simple implementation of this concept, a tone can be transmitted from the presentation system with a predetermined amplitude. The amplitude of the received tone is measured at the user terminal. If it falls below a threshold value, a switch can be activated to boost the amplification of the audio circuits.

Once the logging and initiation procedure has been completed, the navigation session task selects and opens a viewing session with a video display task VDT (FIG. 6), which communicates with a DVS control unit 40. The video display task is supplied with the user terminal address and the transmission path ID for the session. If the channel specified by the transmission path ID is operating at full capacity, and if transmission capacity is available on an alternate channel, the video display task can send a control message to the user terminal to instruct it to tune to an alternate channel. These instructions can be transmitted over the telephone line as DTMF tones, and supplied to the controller 104 from the telephone interface 122. More preferably, they are transmitted to the terminal as data encoded in the vertical blanking interval of the next frame addressed to the terminal. At the terminal this data is separated from the frame, decoded in the video control circuit 112 and supplied to the controller 104. In response to these instructions, the controller 104 causes the tuner 102 to be set to the newly designated alternate channel. An acknowledgement of this change can be sent to the system controller via the telephone lines.

The navigation session task also selects and opens an application task APPL which is determined by the key presses that the user made to activate the system or by an identification transmitted to the presentation system during the log-on procedure. For example, if the viewer depresses the "Y" key to activate the system, the system controller can be programmed to associate this key press with the "Yellow Pages" type of directory database, and would therefore open this application for the session. To this end, the navigation session task can examine a user profile stored in a database 130 to select a pathway for an opening presentation in accordance with previously indicated user preferences stored for that terminal. Other activation keypresses can be associated with the terminal and used to open other predefined databases at the start of a viewing session. With this approach, every viewer in a household can be provided with a different pathway that is determined by the initial keypresses used to activate the system to thereby receive an opening presentation of choice.

If no predefined key is activated at the time of log-on, an opening pathway can also be associated with the user terminal to cause a particular presentation database to be opened when the system is first accessed from that terminal. If no pathway is associated with a particular terminal, the navigation session task might cause a general menu screen to be transmitted to the viewer's terminal over the transmission path designated in the transmission path ID. The viewer can then select one of the available choices from the menu, and when this selection is transmitted to the presentation system the appropriate application would be opened.

Once an application APPL has been opened, it takes over control of the session and the navigation session task reverts to a suspended state to await requests from the application. Basically, the navigation session task functions as a server to the application during this time, making requests to the other tasks as necessary. When an application has been completed and terminates, the navigation session task resumes control of the viewing session.

The navigation session task selects a starting node in the opened application database which is determined by the key presses that the viewer used to initiate the session or by the viewer's personal pathway. This node in the database identifies the initial image which is to be presented to the viewer as part of the video presentation. A start command is then issued to the video display task. In response, the video display task causes one of the DVS control units to retrieve an image file associated with the selected node from the disk storage system 44, decompress the retrieved information to produce a video frame, encode the video frame with the user's address, and present it to the multiplexer 58 to be transmitted to the user terminal to begin a viewing session.

Once the viewing session has begun, the navigation session task or the application provides a list of valid key press combinations to the line handler task for the associated DAS control unit and requests that key press associated tones be accepted from the viewer until a valid match is received or a time out occurs. These valid key press combinations identify the various choices that are available to the viewer for the video frame that is currently being displayed on his receiver. For example, if the directory service has been selected by the viewer, the first frame in that service may be a listing of the topics available for the viewer's review. The valid key press combinations in this situation would be the codes associated with each of the available selections. In addition to the viewer selection key presses, other key press combinations can be recognized as valid input. For example, certain key press combinations can be reserved for specific user requests, such as pause, resume, repeat a frame or skip to the last frame in an active segment. To enable an experienced user to bypass a sequence of menu screens, certain key press combinations can be recognized as user requests to navigate directly to specific nodes in the current presentation database or a new database.

In this regard, certain DTMF tone sequences are transmitted over the telephone lines and interpreted as alphanumeric and punctuation characters. With this capability, the user is provided with a larger range of selections to choose from at any one time. It also provides the ability to send text messages to the presentation system over the telephone lines at the same time as audio information is being received from the presentation system. Such a capability may be useful in an electronic mail context, for example, where the viewer can send a message to the presentation system to be stored in the disk storage system. Other viewers accessing the interactive system can subsequently retrieve messages for them which have been stored in the system.

To this end, the navigation session task can send a control message to another user's terminal to activate a message indicator, such as a light. This indicator alerts the user to access the system in order to retrieve a stored message. Alternatively, the controller 104 within the other viewer's terminal could be instructed to display characters on the viewer's receiver when the viewer turns it on, to indicate that a message has been stored. For example, this function might be performed by setting a bit in the memory of the terminal of the viewer for whom the message is intended. This instruction is most preferably sent to the terminal by means of data in the vertical blanking interval of a frame transmitted to the terminal.

Preferably, the alpha-numeric and punctuation characters are encoded in the form of two pairs of tones for transmission via the telephone lines. In conventional DTMF signalling, the numbers and symbols present on a telephone keypad are each transmitted as a dual-frequency tone. For example, the number "1" is represented by a tone comprised of the frequencies 697 Hz and 1209 Hz, and the star symbol "*" is represented by a tone at the frequencies 852 Hz and 1477 Hz. A total of seven different frequencies are utilized in pairs to transmit the ten numbers and two symbols on a conventional telephone keypad.

To transmit alphabetic characters over the telephone lines as well as the conventional numbers and symbols, these seven frequencies and an eighth, normally unused, frequency are employed. The eighth frequency can have a value of 1633 Hz, for example. This additional frequency is used only for the transmission of characters that are not typically transmitted via DTMF signalling. To indicate the transmission of an alphabetic character, the first tone in a pair of tones which identify the letter can include this eighth frequency as a component thereof. For example, the letter "A" can be transmitted as a first tone comprised of the frequencies 697 Hz and 1633 Hz and a second tone comprised of the frequencies 697 Hz and 1209 Hz. Every other letter can similarly be comprised of a first tone which includes the eighth frequency in combination with one of the seven conventionally employed frequencies, followed by a second tone comprised of any two of the eight available frequencies. Along the same lines, other non-conventional characters, such as punctuation and spaces, can be transmitted from the user terminal in an unambiguous fashion by generating a unique pair of dual-frequency tones upon the depression of a single key on the remote control keypad.

To facilitate the entry of messages into the system, the navigation session task can send control signals to the user terminal to enable and disable local echoing of viewer input. Preferably, these control signals are transmitted in the vertical blanking intervals of frames addressed to the terminal. These control signals cause the character generator 118 to be actuated so that each key press made by the viewer is displayed on the viewer's receiver. Preferably, the remote control unit 16 is provided with appropriate keys that enable the viewer to specify the location of a cursor on the screen. Alternatively, the system controller 22 can send a command to the user terminal to indicate the position at which locally generated characters are to be positioned on the screen.

Each presentation database file stored in the disk system 44 contains nodes. Every node is linked to other nodes via one or more branching paths which are selected by the application APPL in response to viewer input. The record for each node within the database file contains a navigation part, a video display segment part and an audio segment part. The navigation part contains node descriptions and branching information for valid user key press combinations. The audio segment part consists of either or both of an informational audio part, e.g. a description of the item displayed on the viewer's screen, and an instructional audio part, such as help messages for the viewer. The video display segment part contains a number of picture steps. Each picture step includes a number which specifies the location of an image file in the storage system, and a time code which enables the DVS control unit to determine when each frame in a segment is to be transmitted to a user terminal.

As noted previously, each of the still frame images is stored in a compressed format in the disk storage system 44 as part of an image file. Each image file contains information pertaining to one compressed frame of video. If the video frame includes textual and/or graphic information, the frame is not compressed with this information therein. Rather, to improve the resolution of the decompressed image, textual and graphic information is first removed from the frame, and only the pictorial information, i.e., the background picture minus the text, is compressed. The text and graphics information is stored as a separate item of information in the image file.

In addition, the image file can be stored with instructions pertaining to the manner in which the stored video image is to be decompressed. More particularly, compressed images can be decompressed with different resolution factors that depend upon the content of the image. If an image has very low contrast, it can be decompressed using a low resolution algorithm. However, images with a greater degree of contrast, or those which include text or graphics, may require a more sophisticated decompression algorithm. The decompression instructions stored as part of the image file can be supplied to the DVS control unit with the retrieved image data, to instruct the control unit on the type of decompression algorithm that is to be employed for that particular frame. These instructions might simply be an indication that the image contains text or graphics, for example, which would cause the DVS control unit to select a higher resolution decompression algorithm. After the video image is decompressed within the DVS control unit, the text string and graphics are generated or reconstructed in response to instructions stored in the image file, and overlayed on the image to reconstruct the original frame.

In certain types of presentations which employ textual information, some of the information may be fixed while other information can be variable. For example, in a real estate listing service, each frame may contain three types of information: an image of the house, its address, and the current price. Since the address remains fixed, it is stored as a text string in the image file for that video frame. However, since the price may vary over time, it is not stored as part of the image file in the storage system 44. Rather, this information can be separately stored as part of the picture step, for example in the database 130 associated with the system controller. When the frame is to be presented to the viewer, the compressed pictorial information and the fixed text are retrieved from the disk storage system and presented to the appropriate DVS control unit 40. In addition, the variable data is supplied to the DVS control unit by the system controller. This variable data is also overlayed on the video image, which is then transmitted to the viewer.

When processing a video display segment, the presentation system can selectively suppress the instructional audio portion or the informational audio portion of an audio segment part. These suppressions can be made in dependence upon whether the user has already been presented with this particular audio segment. This capability prevents annoyance of viewers by constantly presenting them with repetitious information. In addition, the presentation system can indicate whether the background music should be on or off for any particular video segment. This instruction can be sent to the controller 104 within a user terminal via the telephone lines or by means of the vertical blanking interval in a video frame, for appropriate control of the muting circuit 108 within the user terminal.

During a typical viewing session, the viewer is connected to the presentation system 10, through his user terminal 14, by means of a single telephone line. In some types of services it may be desirable to connect the viewer to a third party as well. For example, if the viewer determines that he would like to obtain more information about a house being displayed as part of a real estate service, he may wish to speak with a real estate agent. The audio boards 48 in the DAS control units 38 can provide such a function while a viewing session is taking place. More particularly, through the actuation of one or more keys on his remote control unit 16, the viewer can send a command to the presentation system that he would like to speak to the real estate agent responsible for the particular house being displayed. In response to this command, the system controller 22 can retrieve the telephone number of the agent, which might be stored as part of the picture step, for example. An instruction is then sent to one of the line handler tasks to dial the real estate agent's number on a different telephone line. This latter telephone line is then bridged to the telephone line connected to the viewer, within the DAS control unit. The viewer can speak to the agent over his telephone handset, while remaining connected to the presentation system 22 over a single outgoing line.

Alternatively, it is possible to automatically terminate the viewing session at the time the connection is made with a third party. In this implementation, the call to the third party does not originate from the presentation system 10. Rather, after the third party's number has been retrieved from the disk storage system 44 or the database 130, it is transmitted to the user terminal 14 along with a command to dial that number. In response, the controller 104 in the user terminal 14 causes the telephone interface circuit 122 to terminate the call to the presentation system 10 and to dial the number of the third party. The viewer is then able to speak with the third party by means of a direct connection from his telephone set.

As noted previously, the address of the user terminal is transmitted from the terminal to the presentation system, along with the transmission path ID, during the initial log-on process. This address is specific to the terminal and is preferably stored in a non-volatile memory associated with the controller 104 of the terminal. This address is also applied to the video control circuit 112 for use in selecting transmitted frames designated for that terminal. In addition to the unique address associated with the terminal, the video control circuit 112 can be provided with a group address that pertains to a number of terminals. This capability is desirable for certain types of presentations that are provided to more than one viewer at a time. For example, if an interactive game is to be played by multiple players, it is preferable to send each frame to all players at once, rather than repeat the frame with different addresses for the various players. Similarly, in an educational network, certain types of presentations may be presented to groups of viewers, rather than individual viewers. These groups can be classified by professions, for example, so that one presentation can be transmitted for doctors, another for teachers, a third for business managers, and so on.

Preferably, the group address can be dynamically changed. To this end, the group address associated with a particular presentation, for example a game, is transmitted from the presentation system to the user terminals for which it is intended via the DAS control units and the telephone lines, or via the vertical blanking interval of transmitted video frames. The address is received in the controller 104 of the terminal and supplied to the video control circuit 112.

The group address can replace the terminal specific address stored within the video control circuit. More preferably, however, the group address is employed in addition to the terminal specific address. Therefore, individual frames which are intended for a particular terminal only can be received at that terminal, as well as frames that are addressed to a group of viewers. Furthermore, a control signal can be transmitted from the presentation system to each of the individual user terminals to indicate whether the terminal should be responsive to its unique address, the group address or both.

Thus, while the terminal is inactive it might be instructed to respond to a particular group address with which all idle frames are encoded, whereas while it is active it can ignore this group address and respond only to frames with its unique address.

The unique terminal address that is stored within each user terminal can also be used to provide a customized presentation when a viewer first accesses the system. For example, if a particular viewer only subscribes to a single service, for example a real estate listing service, this fact can be stored along with the viewer's terminal address in the system controller database 130. When the viewer accesses the system, the initial screen that is transmitted to him can be one that is specific for real estate only. Similarly, viewers subscribing to other services can be programmed to receive specific respective initial screens.

As is apparent from the foregoing, the vertical blanking interval of the video frames is used to transmit data, such as an address and control signals, from the presentation system to the user terminal. This capability can be employed to enable the interactive system to transmit other types of data from the presentation system to the user terminal as well. In one context this ability can be used as an enhancement to the video presentation system. In the context of a real estate listing service, for example, a data file listing the available houses with their addresses and a brief description could be downloaded from the presentation system to a buffer 132 in the user terminal. This downloaded data could then be supplied to a conventional printer attached to the user terminal via a data I/O port 134, to provide a printout to the viewer. Alternatively, a personal computer could be connected to the user terminal port 134 to directly receive the data transmitted via the vertical blanking interval of the video frames.

If a large amount of data is to be transmitted, it may be appropriate to use the horizontal lines in an entire video field or frame, rather than just the lines in the vertical blanking intervals of a number of successive frames.

As a further enhancement to the system, program data could be downloaded from the presentation system to the microprocessor within the local controller of the user terminal. With this capability it becomes possible to change the functionality of the user terminal in accordance with a particular service requirement. For example, a user may desire to play along with a televised game show. In this example, at the start of a viewing session a set of specific instructions are downloaded to the microprocessor of the user terminal, by means of video frames transmitted over the channel associated with the interactive network. The group address described previously can be used to download the same set of instructions to a number of terminals. Once the instructions have been downloaded, the terminal remains connected to the receiver through the switch 100, and the tuner 102 is tuned to the channel on which the game show is being televised. As the game is being televised, new data such as scores and correct answers can be downloaded to the individual terminals to allow the viewers to interact with the game being televised, by way of their terminals. Furthermore, the user's terminal can be requested, by means of commands in the vertical blanking intervals of transmitted frames, to upload information regarding the viewer's progress for further processing. The uploaded information, which is transmitted by way of the telephone lines, can identify the viewer by name and a high score for a particular viewing session.

In the foregoing examples, the data is transmitted to the user terminals in an on-line mode, i.e. it is transmitted to the terminal while the viewer is connected to the presentation system via the telephone lines for interactive control of a presentation. It is also possible to transmit data to the terminals in an off-line mode. To this end, instructions could be sent to all terminals in the vertical blanking interval of a program transmitted over a normal network channel. For example, it may be desirable to provide all viewers who are watching a particular commercial with a coupon for a discount on the product being advertised. The vertical blanking intervals of the frames for the commercial can be encoded with instructions pertaining to the distribution of the coupons. In one embodiment, the user terminal might have a printer integral therewith or connected thereto, and the instructions can control the printer, via the controller 104, to print the coupon at that time or at a later time. If desired, the controller 104 can be commanded, via data encoded in the vertical blanking interval of the frames for the commercial, to display a message instructing the viewer to press a certain key if he desires to receive a coupon. The controller can be further commanded to await the activation of that key before causing the printer to print the coupon.

Alternatively, the instructions might command the controller 104 to dial the system controller 22 or another controller at a later time and transmit information identifying the viewer, so that a coupon can be mailed to the viewer.

The ability to transmit data from the presentation system to the user terminal further enhances the system for use in connection with other services. For example, this ability can be used for closed captioning and other types of teletext services. In addition, the ability to send data to a user terminal and transmit data to the presentation system allows certain types of diagnostics to be implemented. For example, upon request from the presentation system, the user terminal can execute a number of internal routines which verify the performance of the terminal. When a fault is detected, this information can be transmitted to the presentation system, for possible correction prior to the time that the subscriber requires use of the system.

This diagnostic capability can also be extended to test the performance of the cable system or other transmission medium. Various parameters such as signal-to-noise, differential phase and gain, and the like can be measured within the user terminal and the results thereof transmitted to the presentation system.

Similarly, the user terminal can be employed for image error detection. More particularly, during transmission an error could cause a portion of an image to be missing. The user terminal can be provided with the capability to detect such an error and inform the presentation system of it. In one implementation, the terminal can be equipped with a positive feedback mechanism, so that every time an image is received and detected to be proper an acknowledgment is transmitted to the presentation system. With this approach the presentation system is apprised of any missing or erroneous frames, and retransmits them automatically. In an alternative implementation, the terminal can transmit an error message to the presentation system only when it detects a fault in a received frame. This latter approach does not enable missing frames to be identified, but reduces the amount of data traffic on the telephone lines.

As described previously, various types of peripheral devices, such as a personal computer and a printer, can be connected to the user terminal through its data port 134. In this regard, it may be desirable to attach a memory unit, such as a CD ROM, to store fixed information at the user terminal. The data stored in the ROM might be accessed directly by the controller 104, or by an external computer connected to the I/O port 134. Such fixed information might be employed with an interactive game, for example. When the viewer accesses the system to play the game, the system controller can download variable data pertaining to the game, for use by the central controller of the terminal. In addition, it can send a command to the controller 104 to retrieve the fixed information from the local memory unit, such as a pattern to be displayed on the screen. The ability to store some of the data at the remote location of the receiver decreases the amount of data that must be transmitted over the interactive network for a particular service, thereby decreasing the demand on system capacity.

Thus far, the illustrated embodiment of the present invention has been described in the context of a one-to-one association between the viewer and the user terminal. There may be situations in which a single user terminal is shared by a number of viewers at different respective locations. For example, in a multiple dwelling unit such as an apartment building, one user terminal can be located in the building and all of the tenants in the building can have their receivers connected to receive its output. In this situation the viewers would not be at the same location as the user terminal, and therefore would not be able to use the terminal to send commands and selections to the presentation system 10. Rather, the connection between the viewer and the presentation system would be established by means of the viewer's telephone handset. The use of DTMF signals to transmit information between the viewer and the presentation system facilitates this mode of operation, i.e., either a terminal or a handset can be used to transmit commands.

To initiate a viewing session in this latter mode of operation, the viewer tunes his receiver to the channel associated with the interactive network, e.g. channel 33, and dials a telephone number for the network on his telephone. The incoming call is received at one of the audio boards 48 in a DAS control unit 38, and the system controller 22 causes the control unit to respond with a welcome message retrieved from the disk storage system 44 and to request the viewer to enter appropriate identifying information. This information, such as a password, is entered by the viewer using the keypad on his telephone set. In response to this information, the system controller determines the viewer's terminal address from a viewer profile stored in the database 130, and sends an appropriate opening frame to the terminal to be displayed on the viewer's receiver. In addition, the system controller instructs the DAS control unit 38 to dial the user terminal over a second telephone line, to establish a telephone line connection with the user terminal. With this arrangement, therefore, the viewer sends selections to the system controller over one telephone line, and the system controller communicates with the terminal over a second line.

It will be appreciated that, in this implementation, the viewer cannot send alpha-numeric characters to the presentation system. Rather, he is limited to the ten numbers and two symbols on a telephone keypad to transmit instructions and information to the controller 22. In some instances, however, it may be desirable to have the viewer transmit alpha-numeric information. For example, an interactive game may require the user to enter letters of the alphabet in response to questions. In this situation, the system controller can be instructed to interpret conventional DTMF tones as alphabetic characters. More particularly, as part of the initial log-on procedure the system controller determines that the viewer is connected via a telephone handset, rather than a user terminal. Subsequently, if the valid keypresses that it expects to receive in response to an inquiry are letters of the alphabet, it can determine that certain numerical inputs correspond to valid letter combinations. Since each of the keys for the numbers 2 through 9 on a telephone keypad has three letters associated with it, these letters can be identified by the numbers entered by the user. To illustrate, if the answer to a question requires the viewer to enter the word "HELP", the system controller would interpret the numerical sequence "4357" as a correct answer. Once the answer has been entered, the system controller can then respond to subsequent key presses in the normal manner, i.e. treat them as numerical inputs.

From the foregoing it can be seen that the present invention provides an interactive television network offering increased functionality and user capacity. It will be appreciated by those familiar with this art that the present invention can be embodied in forms other than those specifically described herein. For example, in the illustrated embodiment of the present invention the video signal is transmitted in an analog format from the presentation system to the user terminal. It is feasible to implement the features of the present invention in a television system in which the video signal is transmitted as digital information. In this context, the DVS control unit would not include digital-to-analog converters for converting the decompressed video images into an analog signal. Rather, digitized video frames would be presented to the multiplexer for transmission via the appropriate medium. In this case, the user terminal can be provided with a digital-to-analog converter to convert stored frames into analog video signals for presentation to the television receivers. Of course, where the receiver has the ability to process digital video information, such a converter would be unnecessary.

Further along these lines, it is possible to transmit the video information to the user terminal while it is still in a compressed format. Such an embodiment would further increase the capacity of the system, since the video data is effectively transmitted at a higher frame rate. In this case, the functions of a DVS control unit would be implemented within the remotely located user terminal, rather than at the centrally located presentation system. The various algorithms for decompressing the transmitted data could be stored in the memory of the controller 104, or in a separate memory such as the ROM unit described previously.

Similarly, the foregoing description of the interactive television network was presented in the context of handling video information on a frame-by-frame basis. However, it will be appreciated that the video information can be stored, processed and transmitted on a field ($\frac{1}{2}$ frame) basis as well. For example, it is possible to store the images in the disk storage system as compressed video fields. After a field has been decompressed in a DVS control unit, it can be extrapolated into a video frame, using conventional processing techniques, for transmission over the cable network. Alternatively, only the individual field can be transmitted, and then extrapolated into a video frame at the user terminal. This latter approach enables the capacity of the television network to be doubled, since 60 user terminals can be addressed per second, rather than 30 per second in the frame mode. In this embodiment, different algorithms for extrapolating the transmitted field into a full frame can be employed, and the particular algorithm that is applicable to the transmitted field can be downloaded from the system controller 22 to the user terminal.

Further, the disclosed embodiment of the invention is implemented in a one-way cable system, where transmissions on the cable take place in a downstream direction only from the presentation system to the remote terminal. Where two-way cable systems are available, it is possible to employ the upstream transmitting capabilities of the cable system in place of a telephone connection, to transmit data in either an analog or digital form, and thereby achieve the same functionality as the system illustrated herein.

It will be appreciated, therefore, that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A method for selectively distributing video presentations via a television network from a central location to individual remote terminals, comprising the steps of:
   establishing a communications connection between said central location and one of said remote terminals;
   upon establishing said connection, transmitting a transmission path identification from said terminal to the central location by means of said connection, said transmission path identification identifying a particular transmission path in said network for transmitting video information from said central location to the remote terminal;
   transmitting from said remote terminal to said central location, via said connection, a selection for a particular video presentation;
   retrieving video data related to the selected presentation at said central location, encoding the video data with an address associated with the terminal and with said transmission path identification; and
   transmitting the encoded data from the central location to the remote terminal over said particular transmission path.

2. An interactive television system, comprising a centrally located presentation system for transmitting video presentations via a television distribution network over at least one channel on said network, where each presentation includes a plurality of individual images and an optional audio segment, and a plurality of remotely located terminals for receiving the video presentations transmitted over said network and for transmitting information to said presentation system via telephone lines designating desired presentations to be transmitted, said presentation system comprising:
- a storage system for storing, in digital form, individual images and audio segments;
- an audio system for receiving the information transmitted from said remote terminals via the telephone lines and for receiving audio segments from said storage system and transmitting said audio segments to the remote terminals via said telephone lines;
- a video system including means for retrieving individual images stored in said storage system, means for encoding each image with an identification code, and means for transmitting said encoded images via said network; and
- means responsive to the information received by said audio system for controlling said audio system and said video system to retrieve selected audio segments and images, respectively, from said storage system and to transmit the retrieved segments and images to designated terminals;

each of said remote terminals comprising:
- means for receiving television signals transmitted via said network;
- means for examining video images transmitted over said one channel to determine whether they are encoded with a designated identification code and for storing individual images encoded with said designated identification code;
- means for retrieving an image stored in said storing means at a standard television frame rate and forming a continuous, still-frame, video signal;
- means for connecting said terminal to a telephone line;
- means for transmitting information to said presentation system via the telephone line in response to viewer commands, including a telephone interface circuit which automatically dials a telephone number associated with the presentation system in response to a viewer command to thereby establish a telephone connection with said presentation system, and means responsive to the establishment of said telephone connection for transmitting, to the presentation system, a transmission path identification which defines a particular transmission path in said network for transmitting video information from said presentation system to the remote terminal;
- means for receiving audio segments transmitted via the telephone lines from said presentation system; and
- means for combining said continuous, still-frame, video signal with received audio segments to form a composite television signal for presentation to a television receiver.

3. The interactive television system of claim 2 wherein said transmission path identification includes an indication of a particular television channel within said network.

4. The interactive television system of claim 2 wherein said television distribution network comprises a cable television system having plural trunk lines, and said transmission path identification includes an indication of a particular one of said trunk lines to which the remote terminal is connected.

5. The interactive television system of claim 2 wherein a transmission path identification is transmitted from said presentation system to each of the remote terminals as data encoded in video images that are distributed to said terminals prior to the establishment of the telephone connection.

6. The interactive television system of claim 2 wherein said presentation system encodes each video image transmitted to a terminal with the transmission path identification received from that terminal, and further including a frame gate for receiving encoded images from said presentation system and for directing said images along respective transmission path sin accordance with the transmission path identification encoded therein.

7. The interactive television system of claim 2 wherein said identification code comprises an address identifying at least one of said terminals.

8. The interactive television system of claim 2 wherein each of said remote terminals includes a tuner for tuning to different television channels available on said net work, and said presentation system includes means for sending commands to said remote terminals over telephone lines to instruct the tuners in respective terminals to automatically tune to a designated channel.

9. The interactive television system of claim 2 wherein said audio system includes means for dialing telephone numbers over said telephone lines and for bridging a remote terminal connected to said presentation system on one line with a telephone connected on another line.

10. The interactive television system of claim 2 wherein each of said remote terminals includes a tuner for tuning to different television channels available on said network, and said presentation system includes means for sending command to said remote terminals by means of data encoded in the vertical blanking intervals of video frames transmitted to the respective terminals to instruct the tuners in said respective terminals to automatically tune to a designated channel.

11. The interactive television system of claim 2 wherein said video system includes a plurality of video processors for retrieving respective individual images from said storage system and encoding the retrieved images with the addresses of the respective terminals to which they are to be transmitted, and a multiplexer for assembling the retrieved and encoded images into a continuous signal that is transmitted to the terminals via said network.

12. The interactive television system of claim 11 wherein each of said video processors includes means for converting each retrieved image into analog video comprising at least one field of video information, and said multiplexer assembles the analog video from said processors into a continuous analog video signal.

13. The interactive television system of claim 11 wherein the individual images are compressed in accordance with different respective compression algorithms and stored in said storage system in compressed formats, and said video processors include means for decompressing each retrieved image in accordance with different respective decompression algorithms corresponding to their compression formats.

14. The interactive television system of claim 13 wherein information identifying the decompression algorithm to be used for a particular image is stored with the image in said storage system and supplied to a video processor when that image is retrieved from the storage system.

15. The interactive television system of claim 13 wherein some of said individual images contain a combination of pictorial information and fixed textual information, with the textual information for an image being stored in the disk storage system in an uncompressed format separately from the compressed pictorial information, and wherein a video processor retrieves the compressed pictorial information and related textual information for an image from said storage system, decompresses the pictorial information and overlays the textual information on the decompressed pictorial information to form an image corresponding to at least one video field.

16. The interactive television system of claim 15 wherein said controlling means includes means for supplying variable textual information to said video processors to be overlayed on an image in addition to the fixed textual information retrieved from said storage system.

17. The interactive television system of claim 13 further including an image cache associated with said video processors for storing compressed images retrieved from the storage system and for receiving and storing decompressed images generated by a video processor for presentation to said multiplexer.

18. The interactive television system of claim 2 wherein said encoded images are transmitted via said network in digital form, and wherein each of said remote terminals includes a video processor for converting each stored image into an analog video image.

19. The interactive television system of claim 18 wherein said images are stored in said storage system in a compressed format and transmitted via said network in the compressed format, and wherein said video processors include means for decompressing each stored image.

20. The interactive television system of claim 2 wherein each remote terminal includes means for determining whether video frames received from said presentation system contain errors and for notifying said presentation system when a received frame contains an error.

21. The interactive television system of claim 20 wherein said notifying means provides a signal to said presentation system via a telephone line each time that a video frame is received at said terminal.

22. The interactive television system of claim 21 wherein said signal indicates whether the received frame contains any errors.

23. The interactive television system of claim 20 wherein said notifying means provides a signal to said presentation system via a telephone line when a received video frame contains an error.

24. The interactive television system, comprising a centrally located presentation system for transmitting video presentations via a television distribution network over at least one channel on said network, where each presentation includes a plurality of individual images and an optional audio segment, and a plurality of remotely located terminals for receiving the video presentations transmitted over said network and for transmitting information to said presentation system via telephone lines designating desired presentations to be transmitted, said presentation system comprising:
a storage system for storing, in digital form, individual images and audio segments;
an audio system for receiving the information transmitted from said remote terminals via the telephone lines and for retrieving audio segments from said storage system and transmitting said audio segments to the remote terminals via said telephone lines;
a video system including means for retrieving individual images stored in said storage system, means for encoding each image with an identification code and means for transmitting said encoded images via said network; and
means responsive to the information received by said audio system for controlling said audio system and said video system to retrieve selected audio segments and images, respectively, from said storage system and to transmit the retrieved segments and images to designated terminals, means responsive to an identification of at least one of a terminal and a viewer for selecting an initial video presentation determined by said identification for transmission to a terminal and display on a television receiver connected to said terminal;
each of said remote terminals comprising:
means for receiving television signals transmitted via said network;
means for examining video images transmitted over said one channel to determine whether they are encoded with a designated identification code and for storing individual images encoded with said designated identification code;
means for retrieving an image stored in said storing means at a standard television frame rate and forming a continuous, still-frame, video signal;
means for connecting said terminal to a telephone line;
means for transmitting information to said presentation system via the telephone line in response to viewer commands, including means for transmitting said identification of at least one of the terminals and the viewer;
means for receiving audio segments transmitted via the telephone lines from said presentation system; and
means for combining said continuous, still-frame, video signal with received audio segments to form a composite television signal for presentation to a television receiver.

25. A method for selectively distributing video presentations via a television network from a central location to individual remote terminals, comprising the steps of:
transmitting non-selected video data from said central location to the remote terminals and encoding said non-selected data with an identification of the path over which it is being transmitted;
establishing a communications connection between said central location and one of said remote terminals;
detecting said identification of the transmission path at the remote terminal;
upon establishing said connection, transmitting the detected identification from said terminal to the central location by means of said connection;
transmitting from said remote terminal to said central location, via said connection, a selection for a particular video presentation;
retrieving video data related to the selected presentation at said central location, encoding the video data with an identification code and with said transmission path identification; and transmitting the encoded data from the central location to the remote terminal over said identified transmission path.

26. A method for selectively distributing video presentations via a television network from a central location to individual remote terminals, comprising the steps of:
   initiating a telephone call from one of said remote terminals to establish a telephone line connection with said central location;
   upon establishing said connection, transmitting a transmission path identification from said terminal to the central location by means of the telephone line connection, said transmission path identification identifying a particular transmission path in said network for transmitting video information from said central location to the remote terminal;
   transmitting from said remote terminal to said central location, via said telephone line connection, a selection for a particular video presentation;
   retrieving video data related to the selected presentation at said central location, encoding the video data with an address associated with the terminal and with said transmission path identification; and
   transmitting the encoded data from the central location to the remote terminal over said particular transmission path.

27. The interactive television system of claim 26 wherein said step of transmitting said selection comprises the steps of storing information at said central location which associates at least one of a remote terminal and an individual viewer with a particular video presentation, transmitting an identification of at least one of the terminal and the viewer from the terminal to the central location, and automatically retrieving said particular video presentation in response to said identification for transmission to said terminal and display on a television receiver connected to said terminal.

28. The method of claim 26 wherein said transmission path identification includes an indication of a particular television channel within said network.

29. The method of claim 26 wherein said television distribution network comprises a cable television system having plural trunk lines, and said transmission path identification includes an indication of a particular one of said trunk lines to which the remote terminal is connected.

30. The method of claim 26 wherein said television network includes a frame gate having plural output paths, and further comprising the steps of:
   transmitting the encoded video data from said central location to said frame gate over at least one predetermined path;
   detecting the transmission path identification encoded in the video data; and
   directing the video data to one of said output paths in accordance with the detected transmission path identification.

31. The method of claim 30 wherein said plural output paths comprise different respective channels available on said television network.

32. The method of claim 30 wherein said plural output paths comprise different physical paths in said television network.

33. The method of claim 32 wherein said different physical paths are different trunk lines in a cable television system.

34. The method of claim 26 wherein said selections are transmitted from said remote terminal to said central location by means of numeric characters and alphabetic characters.

35. The method of claim 34 wherein each numeric character is transmitted over said telephone line by means of single DTMF tone comprised of a pair of predetermined frequencies, nd each alphabetic character is transmitted by means of two sequential DTMF tones wherein at least the first tone includes a unique frequency which identifies it as a non-numeric character.

36. An interactive television system, comprising a centrally located presentation system for transmitting video presentations via a television distribution network over at least one channel on said network, where each presentation includes a plurality of individual images and an optional audio segment, and a plurality of remotely located terminals for receiving the video presentations transmitted over said network and for transmitting information to said presentation system to designate desired presentations to be transmitted, said presentation system comprising:
   a storage system for storing, in digital form, individual images and audio segments;
   an audio system for retrieving audio segments from said storage system and transmitting said audio segments to the remote terminals;
   a video system including means for retrieving individual images stored in said storage system, means for encoding each image with an identification code and means for transmitting said encoded images via said network; and
   means responsive to the information received from said remote terminals for controlling said audio system and said video system to retrieve selected audio segments and images, respectively, from said storage system and to transmit the retrieved segments and images to designated terminals;
   each of said remote terminals comprising:
   means for receiving television signals transmitted via said network;
   means for examining video images transmitted over said channel to determine whether they are encoded with a designated identification code and for storing individual images encoded with said designated identification code;
   means for retrieving an image stored in said storing means at a standard television frame rate and forming a continuous, still-frame, video signal;
   means for transmitting information to said presentation system in response to viewer commands, including means for transmitting, to the presentation system, a transmission path identification which defines a particular transmission path in said network for transmitting video information from said presentation system to the remote terminal;
   means for receiving audio segments transmitted from said presentation system; and
   means for combining said continuous, still-frame, video signal with received audio segments to form a composite television signal for presentation to a television receiver.

37. The interactive television system of claim 36 wherein said transmission path identification includes an indication of a particular television channel within said network.

38. The interactive television system of claim 36 wherein said television distribution network comprises a cable television system having plural trunk lines, and said transmission path identification includes an indication of a particular one of said trunk lines to which the remote terminal is connected.

39. The interactive television system of claim 36 wherein a transmission path identification is transmitted from said presentation system to each of the remote terminals as data encoded in video images that are distributed to said terminals.

40. A method for selectively distributing video presentations via a television network from a central location to individual remote terminals, comprising the steps of:
  transmitting non-selected video data from said central location to the remote terminals and encoding said non-selected data with an identification of the path over which it is being transmitted;
  initiating a telephone call from one of said remote terminals to establish a telephone line connection with said central location;
  detecting said identification of the transmission path at the remote terminal at the time the telephone call is initiated;
  upon establishing said connection, transmitting the detected identification from said terminal to the central location by means of the telephone line connection;
  transmitting from said remote terminal to said central location, via said telephone line connection, a selection for a particular video presentation;
  retrieving video data related to the selected presentation at said central location, encoding the video data with an identification code and with said transmission path identification; and
  transmitting the encoded data from the central location to the remote terminal over said identified transmission path.

41. The method of claim 40 wherein said television distribution network comprises a cable television system having plural trunk lines, and said transmission path identification includes an indication of a particular one of said trunk lines to which the remote terminal is connected.

42. The method of claim 40 wherein said transmission path identification includes an indication of a particular television channel within said network.

43. An interactive television system, comprising a centrally located presentation system for transmitting video presentations via a television distribution network over at least one channel on said network, where each presentation includes a plurality of individual images and an optional audio segment, and a plurality of remotely located terminals for receiving the video presentations transmitted over said network and for transmitting information to said presentation system to designate desired presentations to be transmitted, said presentation system comprising:
  a storage system for storing, in digital form, individual images and audio segments;
  an audio system for retrieving audio segments from said storage system and transmitting said audio segments to the remote terminals;
  a video system including means for retrieving individual images stored in said storage system, means for encoding each image with an identification code and means for transmitting said encoded images via said network; and
  means responsive to the information received from said remote terminals for controlling said audio system and said video system to retrieve selected audio segments and images, respectively, from said storage system and to transmit the retrieved segments and images to designated terminals, including means responsive to an identification of at least one of a terminal and a viewer for selecting an initial video presentation determined by said identification for transmission to the terminal associated with said identification and display on a television receiver connected to said terminal;
  each of said remote terminals comprising:
  means for receiving television signals transmitted via said network;
  means for examining video images transmitted over said one channel to determine whether they are encoded with a designated identification code and for storing individual images encoded with said designated identification code;
  means for retrieving an image stored in said storing means at a standard television frame rate and forming a continuous, still-frame, video signal;
  means for transmitting information to said presentation system in response to viewer commands, including means for transmitting said identification of at least one of the terminal and the viewer;
  means for receiving audio segments transmitted from said presentation system; and
  means for combining said continuous, still-frame, video signal with received audio segments to form a composite television signal for presentation to a television receiver.

44. An interactive television system, comprising a centrally located presentation system for transmitting video presentations via a television distribution network over at least one channel on said network, and a plurality of remotely located terminals for receiving the video presentations transmitted over said network and for transmitting information to said presentation system to designate desired presentations to be transmitted, said presentation system comprising:
  a storage system for storing information in digital form, including information describing individual images which form a video presentation;
  means for receiving information transmitted from said remote terminals;
  a video system including means for retrieving individual images stored in said storage system, means for encoding each image with an identification code, and means for transmitting said encoded images via said network; and
  means responsive to the information received from said remote terminals for controlling said video system to retrieve selected images from said storage system and to transmit the retrieved images to designated terminals;
  each of said remote terminals comprising:
  means for receiving television signals transmitted via said network;
  means for examining video images transmitted over said one channel to determine whether they are encoded with a designated identification code and for storing individual images encoded with said designated code;

means for retrieving an image stored in said storing means at a standard television frame rate and forming a continuous, still-frame, video signal an input device having keys for designating numeric characters and keys for designating alphabetic characters to enable a user to enter commands pertaining to the display of desired video presentations and to compose messages for transmission to other users in the system;

means responsive to actuation of the keys on said input device for transmitting user-entered commands and for transmitting user-generated messages to said presentation system;

said controlling means of said presentation system including means responsive to the transmission of a message from a remote terminal to store said messages in said storage system and to provide an indication to the user for whom the message is intended that there is a stored message to be transmitted to that user, and means responsive to an acknowledgement from the user for transmitting the stored message to the user.

45. The system of claim 44 wherein said input device is a remote control unit that communicates with said terminal via infrared light.

46. The system of claim 44 wherein each of said remote terminals includes an indicator light and said controlling means provides said indication to a user for whom a message has been stored by causing said indicator light on said intended user's terminal to be actuated.

47. The system of claim 44 wherein said controlling means provides said indication by examining the identity of each user who requests access to the system and, upon detecting that a user requesting access is one for whom a message has been stored, controlling said storage system and said video system to retrieve a predetermined video image stored in said storage system and transmit said image to the user's remote terminal for display on a television receiver to inform the user that a message is waiting.

48. The system of claim 44 wherein a stored message is transmitted to an intended user by means of one or more video fields which are transmitted to the intended user's remote terminal.

49. The system of claim 44 wherein the remote terminal includes a character generator and means responsive to the actuation of keys on said input device to control said character generator to display characters on a television receiver corresponding to the keys actuated on said input device, to thereby provide local echoing of the message being generated by a user.

50. The system of claim 49 wherein said presentation system is responsive to a command indicating that a user desires to transmit a message and provides a signal to said controlling means in said remote terminal in response to said command to selectively actuate said character generator.

51. An interactive television system, comprising a centrally located presentation system for transmitting video presentations via a television distribution network over at least one channel on said network, where at least some of the presentations include video images of one type have pictorial information and accompanying fixed textual information, and a plurality of remotely located terminals for receiving respective video presentations transmitted over said network and forwarding them to television receivers for display, said video presentation system comprising:

a storage system for storing video images in a digital form and having first memory locations for storing the pictorial information of said one type of video images in a compressed digital format and second memory locations for storing the accompanying fixed textual information of said one type of images in an uncompressed format separately from the compressed pictorial information;

a video processing system for receiving the stored compressed pictorial and uncompressed textual information of a video image of said one type, decompressing the pictorial information, and overlaying the textual information on the decompressed pictorial information to form an image corresponding to at least one video field; and means for responsive to information describing a presentation desired to be viewed by a viewer for controlling said storage system to retrieve selected stored video images and present them to said video processing system.

52. The interactive television system of claim 51 wherein different images having pictorial information are compressed in accordance with different respective compression algorithms and decompressed in accordance with different respective decompression algorithms, and wherein information identifying the decompression algorithm to be used for a particular image is stored with the image in said storage system and supplied to a video processor when that image is retrieved from the storage system.

53. The interactive television system of claim 51 wherein said controlling means includes means for supplying variable textual information to said video processors to be overlaid on an image in addition to the fixed textual information retrieved from said storage system.

54. The interactive television system of claim 51 wherein said video processing system includes a plurality of video processors for retrieving respective individual images from said storage system and encoding the retrieved images with the addresses of the respective terminals to which they are to be transmitted, and a multiplexer for assembling the retrieved and encoded images into a continuous signal that is transmitted to the terminals via said network.

55. The interactive television system of claim 54 wherein each of said video processors includes means for converting each retrieved image into analog video comprising at least one field of video information, and said multiplexer assembles the analog video from said processors into a continuous analog video signal.

56. The interactive television system of claim 54 further including an image cache associated with said video processors for storing compressed pictorial information retrieved from the storage system and for receiving and storing decompressed images generated by a video processor for presentation to said multiplexer.

* * * * *